Jan. 20, 1948.　　W. T. WHITE ET AL　　2,434,680
LIMIT STOP APPARATUS
Filed Aug. 2, 1944　　2 Sheets-Sheet 1

INVENTOR.
WALTER T. WHITE
DONALD H. COURTER
BY
*Paul B. Hunter*
ATTORNEY

Jan. 20, 1948. W. T. WHITE ET AL 2,434,680
LIMIT STOP APPARATUS
Filed Aug. 2, 1944 2 Sheets-Sheet 2

INVENTOR.
WALTER T. WHITE
DONALD H. COURTER
BY
*Paul B. Hunter*
ATTORNEY

Patented Jan. 20, 1948

2,434,680

UNITED STATES PATENT OFFICE 2,434,680

LIMIT STOP APPARATUS

Walter Thomas White and Donald Henschell Courter, Hempstead, N. Y., assignors to Sperry Gyroscope Company, Inc., a corporation of New York Application August 2, 1944, Serial No. 547,787

26 Claims. (Cl. 318—468)

1

This invention relates generally to motor control systems in which the direction and speed of a motor is determined by an electronic control circuit in response to the direction and magnitude of a control signal, and particularly concerns limit stop apparatus for arresting the rotation of the motor irrespective of the control signal when a limit condition is reached.

The major object of the invention is to provide an electronic cut-off control responsive to a limit condition to remove controlling signals from the motor during the existence of a limit condition.

Another object of the invention is to provide electrical limit stop apparatus for rapidly arresting rotation of a motor.

A further object of the invention is to provide electrical limit stop apparatus for rapidly arresting rotation of the motor independently of its speed.

A further object of the invention is to provide apparatus responsive to a limit condition of the motor for applying a reverse torque impulse thereto.

A still further object of the invention is to provide limit stop apparatus in which a reverse torque impulse is produced in the motor of a magnitude, determined by the signal controlling the speed of the motor.

A still further object of the invention is to provide a limit stop apparatus for arresting a motor by modifying its control circuit in a manner which permits the motor to drive itself out of a limit condition.

Figure 1:
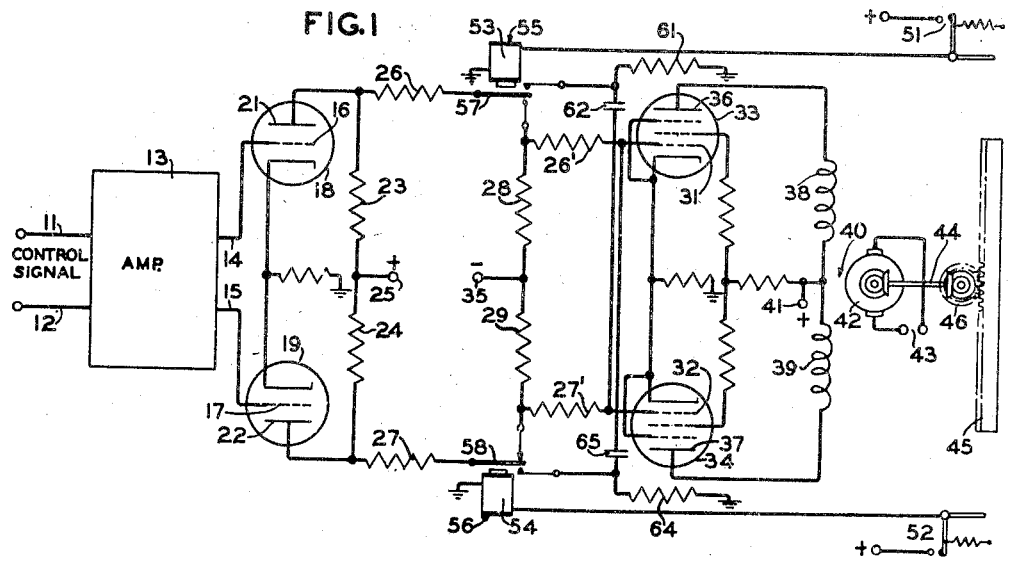
Figure 2:
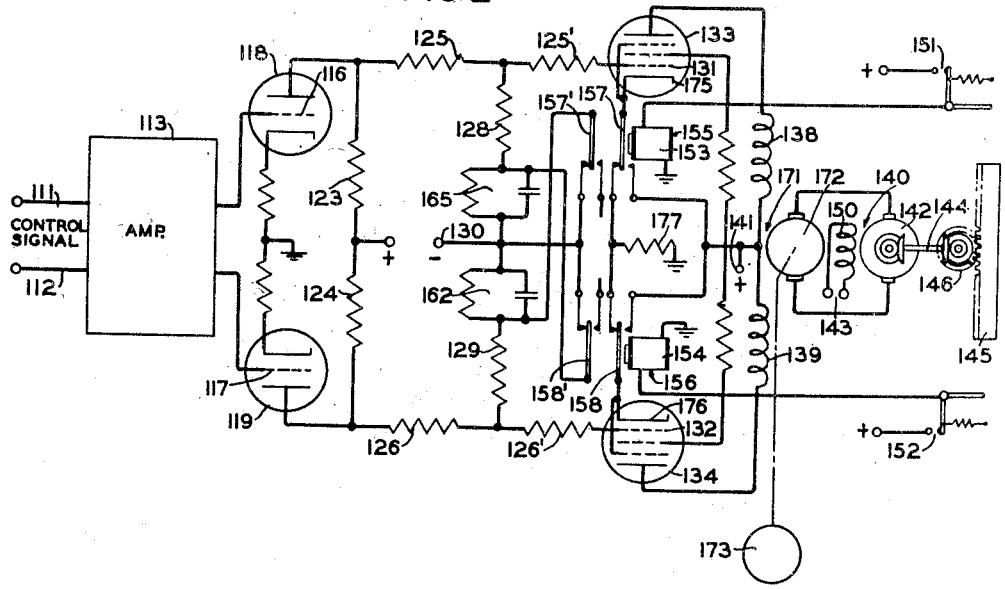
Figure 3:
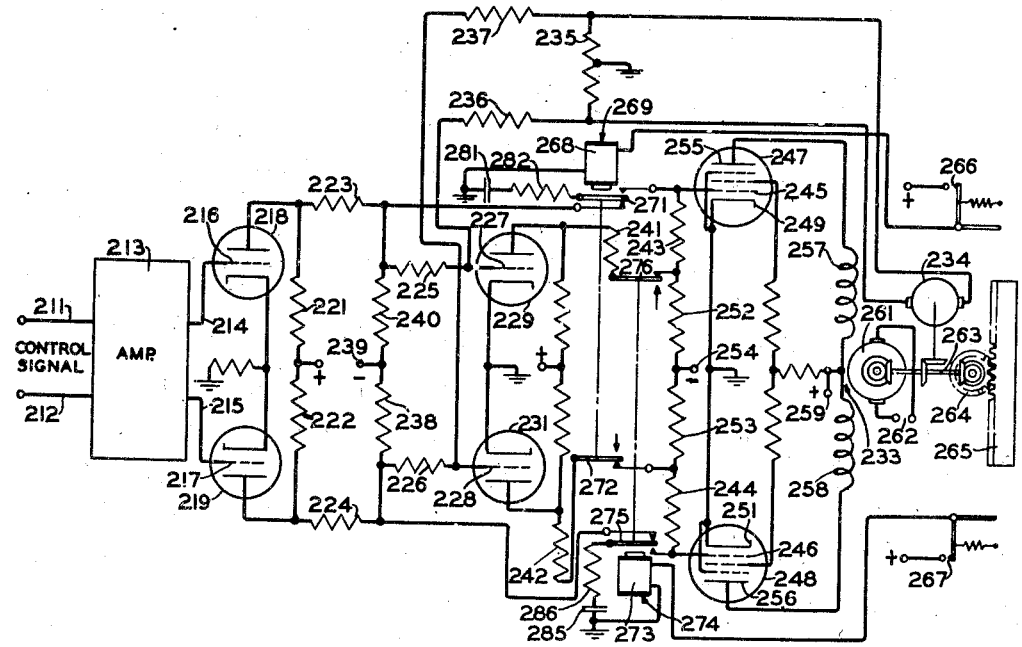

Other objects and specific advantages of the invention will become apparent from the following description taken in connection with the accompanying drawings, wherein:

Fig. 1 is a schematic wiring diagram of a motor control system in which the limit stop apparatus is connected to a control circuit directly connected to the motor;

Fig. 2 is a schematic wiring diagram of a motor control system in which the invention is connected to limit stop apparatus connected to a control circuit for a generator, the output of which controls a motor; and Fig. 3 is a schematic wiring diagram of a motor control system of the speed lag type which is provided with velocity damping and includes limit stop apparatus embodying the invention to produce a reverse torque in the motor dependent upon its speed.

According to the invention, a control circuit includes a balanced amplifier for controlling the currents in opposing field windings of a motor or a generator. A limit switch is operated in response to a limit condition for removing the driving power from the motor by applying a cut-off potential to the electron discharge device in the balanced amplifier which is controlling the current in the driving field winding. In order to quickly stop the motor, a reverse torque impulse may be produced therein by causing a pulse of current in the non-driving electron discharge device of the balanced amplifier to produce a flux pulse in the field of the motor or generator which opposes the direction of rotation of the motor.

Accurate stopping control may be obtained by generating the pulse signal according to the control signal to produce a reverse torque impulse which depends upon a control signal. In a motor control system where the speed of the motor is substantially proportional to the control signal, the reverse torque impulse will then be substantially proportional to the speed of the motor. By appropriate selection of circuit values, it is possible to obtain quick and complete stoppage of the motor when a limit condition is reached.

The motor control system shown in Fig. 1, is arranged to be connected to a control signal source as by leads 11 and 12 which are supplied to an amplifier 13 that may include a suitable demodulator circuit to convert the control signal to a balanced unidirectional voltage in the event the control signal is an alternating voltage. The balanced unidirectional voltage from the amplifier 13 is supplied as by leads 14 and 15 to control grids 16 and 17 of amplifier tubes 18 and 19 that are arranged in a conventional balanced circuit with their plates 21 and 22 connected through load resistors 23 and 24 to a suitable source of positive potential 25. The amplified control signal, appearing across resistors 23 and 24, is supplied through coupling resistors 26 and 27 and coupling resistors 26' and 27' across grid leak resistors 28 and 29 to control grids 31 and 32 of power amplifier tubes 33 and 34. The power amplifier tubes are shown as pentodes connected in a conventional balanced amplifier circuit directly coupled to the output of the amplifier tubes 18 and 19 and having their control grids 31 and 32 connected through resistors 28 and 29 to a source 35 of negative potential. The positive and negative potentials, from terminals 25 and 35, have substantially constant values measured with respect to the ground.

Plates 36 and 37 of the power amplifier tubes 33 and 34 are connected through opposing field windings 38 and 39 of motor 40 to a source of positive potential 41. With this arrangement the currents in the windings 38 and 39 depend upon the space currents of tubes 33 and 34, which in turn are controlled by the potentials of control grids 31 and 32.

The motor 40 has its armature 42 connected to a suitable constant current source 43, so the speed or acceleration of the motor 40 and its output shaft 44 are dependent upon the effective field as determined by the difference between the currents in the field windings 38 and 39. The motor 40 may, of course, drive any suitable load, as represented by a rack 45, that is driven by a pinion 46 from the shaft 44.

A pair of limit switches 51 and 52 are arranged to be closed by limit conditions of the load to energize coils 53 and 54 of relays 55 and 56 which operate switch contacts 57 and 58 respectively. The contact 57 is normally closed to complete the coupling circuit, including resistors 26 and 28, between tubes 18 and 33 of the two balanced amplifier circuits. When the relay 55 is energized, contact 57 breaks the connection between the resistors 26 and 26' thereby causing the full negative potential of source 35 to be applied through grid leak 28 to the control grid 31. At the same time, the contact 57 closes to its other position to connect the output of tube 18 through resistor 26 across resistor 61 that is connected to ground. A condenser 62 is connected from resistor 61 to the control grid 32 of the tube 34 so the surge of current through resistor 61, when the relay 55 is operated, causes a positive pulse to be applied through condenser 62 to the control grid 32 of the tube 34 thereby momentarily increasing the conductivity of the tube 34, to increase the space current and the current drawn through winding 39 of the motor 42.

Relay 56 may be energized by limit switch 52 upon movement of the load in the opposite direction to disconnect the control grid 32 from the amplifier tube 19 thereby cutting off the tube 34 by the negative potential of source 35. At the same time, positive voltage, from the output of the tube 19, is applied through resistor 27 and contact 58 across resistor 64 to ground. A condenser 65 is connected between resistor 64 and control grid 31 of the tube 33. When the relay 56 is energized, the surge of current through resistor 64 charging the condenser 65 supplies a positive pulse to grid 31 momentarily increasing the conductivity of the tube 33 to produce a pulse of current through winding 38 which causes the motor 40 to produce a reverse torque impulse.

In operation a control signal applied to the amplifier 13 controls the potentials of grids 31 and 32 to regulate the space currents in tubes 33 and 34 for controlling the currents in opposing field windings 38 and 39 so the effective field of the motor 40 depends upon the control signal and causes the motor to drive shaft 44 and its rack load 45. Assuming that the tube 33 is more conductive, the current in winding 38 will exceed that in winding 39, causing the motor 40 to move the rack 45 upwardly until it actuates limit switch 51. The actuation of the limit switch 51 energizes relay 55 to remove the coupling between amplifier tubes 18 and 33 thereby cutting off the tube 33 and removing the field current from the winding 38 to reduce the driving torque of the motor 40. At the same time, switch contact 57 is closed to apply the output voltage from tube 18 across the resistor 61 and condenser 62.

This applies a positive pulse to the grid 32 thereby momentarily increasing the conductivity of the non-driving tube 34 to increase its space current as well as the current through winding 39. This pulse of current drawn through winding 39 produces a reverse torque impulse in the motor 40 which tends to reverse the motor and is, preferably, of just sufficient magnitude to stop the motor, its driving torque having been already removed by cutting off tube 33.

It has been found advantageous to cause the reverse torque impulse to be dependent upon the magnitude of the control signal. Since the output voltage of tube 18 is dependent upon the control signal, the voltage pulse applied through condenser 62 is likewise dependent upon the control signal. Whether or not the reverse torque impulse corresponds to the speed of the motor, depends upon the dynamic characteristics of the motor control system. If the system is designed so that the motor is driven at a speed proportional to the magnitude of the control signal, the reverse torque impulse, which is also substantially proportional to the control signal, will also correspond to the speed of the motor and, by appropriate selection of proportionality factors, may be made equal and opposite to the momentum of the armature and the load driven thereby.

Fig. 2 shows a modified motor control system in which an error signal from leads 111 and 112 is supplied to an amplifier 113, the output of which is coupled to grids 116 and 117 of amplifier tubes 118 and 119, arranged in a balanced circuit. The output of this balanced amplifier circuit, appearing across load resistors 123 and 124, is supplied through coupling resistors 125 and 126 and coupling resistors 125' and 126' to control grids 131 and 132 of pentodes 133 and 134 which are also arranged in a balanced circuit, having their space paths respectively connected in series with opposing field windings 138 and 139 of a generator 171.

The generator 171 has its armature 172 driven at a constant speed as by a motor 173 and connected to armature 142 of motor 140. Field winding 150 of the motor 140 is energized from a suitable source 143 and the armature 142 drives through shaft 144 and pinion 146 to move a rack 145 representing a suitable load.

The tubes 133 and 134 have their cathodes 175 and 176 normally connected through a cathode bias resistor 177 to ground. When the rack 145 reaches its upper limit, it closes limit switch 151 thereby energizing the coil 153 of relay 155 to operate switch contacts 157 and 157'. Actuation of contact 157, by energization of relay 155, removes the connection of cathode 175 to bias resistor 177 and connects the cathode 175 directly to the source 141 of positive potential thereby raising the potential of the cathode 175 to cut-off the tube 133.

The grid 131 of the tube 133 is normally connected through grid leak resistor 128 to a negative potential source 130 and grid 132 of the tube 134 is also normally connected through grid leak resistor 129 to the negative source 130. When the relay 155 is energized, contact 157' removes a short-circuit from parallel connected resistance condenser network 162 arranged between the resistor 129 and the source 130. This removal of the short-circuit across the network 162 causes a charging current to flow in the condenser which applies a positive voltage pulse to the grid 132, momentarily increasing the conductivity of the tube 134 and the space current drawn thereby as well as the current in field winding 139. This pulse of current in the field winding 139 produces a pulse voltage which is applied to armature 142 that produces a reverse torque impulse in the motor 140. Since the driving power from motor 140 has been removed by biasing the tube 133 to reduce the output of the generator 171, the reverse torque impulse produced by the pulse voltage applied to the grid 132 will stop rotation of the motor 142.

When the tube 134 is more conductive than the tube 133, it becomes the driving tube and produces a current in the winding 139 so generator 171 applies an output voltage to the motor 140 tending to drive the rack 145 downwardly. When the rack 145 reaches its lower limit it closes limit switch 152 to energize coil 154 of relay 156 which operates contact 158 to connect cathode 176 of the tube 134 directly to the source 141 thereby raising the potential of the cathode 176 to cutoff the tube. At the same time, relay 156 actuates contact 158' to remove the short-circuit of parallel connected resistance condenser network 165 interposed between the grid leak resistor 128 and the negative source 130. Charging current in the network 165 applies a positive voltage pulse to the grid 131 momentarily increasing the conductivity of the tube 133 to cause a reverse voltage pulse from the generator 171 to produce a reverse torque impulse in the motor 140. Since the driving power for the motor 140 is removed by cutting off the tube 134, the reverse torque impulse will tend to stop rotation of the motor and its load.

As in the case of the motor control system described in connection with Fig. 1, a voltage impulse is produced that is dependent upon the control signal so a reverse torque impulse is obtained in the motor that is related to its speed or acceleration.

The motor control system, shown in Fig. 3, is similar to that in Fig. 1, but is a more refined system in that velocity damping is provided for stabilizing the operation of the motor and the system is of the type known as a speed lag control wherein the speed of the motor is substantially proportional to the control signal. The control signal may be derived from any source and is frequently taken as the output of a remote control transmission system or as the error signal in a follow-up system. Such an error or control signal may be connected as by leads 211 and 212 to an amplifier 213, the output of which as represented by leads 214 and 215 is supplied to grids 216 and 217 of tubes 218 and 219 that are arranged in a balanced amplifier circuit to produce a differential voltage across load resistors 221 and 222 of a polarity and magnitude dependent upon the control signal. In the case of a unidirectional error or control signal, the differential voltage will be of a polarity and magnitude corresponding to the polarity and magnitude of the control signal.

This differential voltage is directly coupled as by resistors 223 and 224 and resistors 225 and 226 to grids 227 and 228 of summing amplifier tubes 229 and 231 respectively. An additional signal, corresponding to the speed of motor 233, is generated as by a permanent magnet generator 234 driven from the motor, and is applied across resistor 235 having its center point grounded to provide a balanced unidirectional signal which may be applied through coupling resistors 236 and 237 to grids 227 and 228 respectively. The polarity of the generator is selected so it produces a degenerative effect by opposing the differential voltage from tubes 218 and 219 which depends upon the control signal.

With this arrangement, the potential of grids 227 and 228, which in the quiescent state, are biased through grid leak resistors 240 and 238 to a source 239 of negative potential, is controlled according to the difference between the control signal and velocity signal of the motor. This is a well known arrangement in that the velocity signal is used in a degenerative sense to provide velocity damping for stabilizing the operation of the motor 233.

The combination of signals supplied to the grids 227 and 228 is amplified by the tubes 229 and 231 and is coupled through resistors 241 and 242 that are normally connected to resistors 243 and 244 which are in turn connected to control grids 245 and 246 of amplifier tubes 247 and 248, shown in this case as pentodes having their cathodes 249 and 251 connected in a balanced circuit to ground. During the quiescent state, control grids 245 and 246 are connected through grid leak resistors 252 and 253 to a source 254 of negative potential. Plates 255 and 256, of the power tubes 247 and 248, are respectively connected through opposing field windings 257 and 258 to a source 259 of positive potential.

During normal operation, the effective field of the motor 233 will depend upon the difference between the currents in field windings 257 and 258 as determined by the space currents of power tubes 247 and 248 which in turn depend upon the potentials of control grids 245 and 246 as determined by the difference between the control and velocity damping signals.

The motor 233 has its armature 261 connected to a suitable constant-current source 262 and arranged to drive through shaft 263 and pinion 264 to operate a load in the form of a rack 265. In order to stop the motor when the load reaches a limit condition, limit switches 266 and 267 are arranged to be actuated by the rack 265 when the motor drives it to a limit condition. Actuation of the limit switch 266 energizes coil 268 of a relay 269 that operates ganged contacts 271 and 272. Similarly, actuation of the limit switch 267 energizes coil 273 of relay 274 which operates ganged switch contacts 275 and 276.

When the load rack 265 is driven by the motor 233 to its upper limit, it causes limit switch 266 to energize relay 269 thereby operating switch contact 271 and switch contact 272. When the motor is driving in this direction, tube 248 is supplying the driving current to field winding 258. Operation of the switch contact 272 removes the positive signal from the input grid of tube 248, thereby cutting off the space current in the power tube 248 due to the negative bias potential from source 254.

This removes the driving power from the motor, but in order to stop the motor, it is necessary to produce a reverse torque impulse. For this purpose, a condenser 281 is charged from the output of tube 218 through switch contact 271 and resistor 282. The potential of the condenser 281, when it is charged, depends upon the control signal. Since the amplifiers are all balanced circuits and the stage including tubes 229 and 231 inverts the signal from tubes 218 and 219, a positive charge will appear on the condenser 281 when the nature of the control signal is such that tube 248 provides the power current to the motor 233.

When the switch contact 271 is operated by the relay 269, the charge on the condenser 281 is applied directly to the control grid 245 of tube 247 and the discharge of the condenser 281 applies a positive voltage pulse to this control grid. This application of a positive voltage pulse to the control grid 245 produces a momentary increase in the space current of the power tube 247 thereby momentarily increasing the current in field winding 251 to produce a reverse torque impulse in the motor 233. Since the velocity of the motor 233, as previously explained, is substantially proportional to the magnitude of the control signal, the charge on the condenser 281 will also be substantially proportional to the velocity of the motor. By appropriate selection of circuit constants, this charge may be made just sufficient to produce a reverse torque in the motor 233 that will oppose the momentum of the load, thereby rapidly stopping rotation of the motor 261 when the limit condition is reached.

By a similar arrangement, when the rack 265 reaches its lower limit condition, limit switch 267 energizes relay 274 to operate switch contacts 275 and 276. When the motor 233 is driving in this direction, the power tube 247 is supplying driving current and operation of the switch contact 276 removes the positive control voltage from the control grid 245 so the tube 247 is cut-off by the application of the negative potential from the source 254. A condenser 285 is charged from the output of tube 219 through switch contact 275 and resistor 286. When the relay 274 is operated, the charge on the condenser 285 causes a positive pulse to be applied to the control grid 246 of the power tube 248 thereby causing a momentary increase in the space current of the tube 248 which produces a reverse torque impulse in the motor 233 to arrest motion of the load 265.

In the apparatus shown in Fig. 3, it will be apparent that when a limit is reached, the driving power is removed from the motor by cutting off the driving tube and at the same time the opposite tube of the balanced power amplifier is provided with a positive voltage pulse which produces a momentary increase in the current of the motor field, thereby producing a reverse torque impulse in the motor which stops the motor and its load. The positive voltage pulse is made substantially proportional to the error signal. Since the velocity of the motor is also proportional to the error signal, the reverse torque impulse is made substantially proportional to the velocity of the motor. With this arrangement and by proper selection of proportionality factors for the circuits, the reverse torque impulse becomes equivalent to the momentum of the load and rapidly stops rotation of the motor without reversing the direction of rotation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Limit stop apparatus for a motor comprising a control circuit including two control means responsive to opposing signals and having their outputs differentially supplied to control the speed and direction of operation of said motor, a limit switch adapted to be operated by said motor when a limit condition thereof is reached, and means controlled by operation of said limit switch for adding a component of the one signal to the other to reduce the driving power of said motor.

2. Limit stop apparatus for a motor comprising a control circuit including a pair of electron discharge devices arranged in a balanced circuit responsive to a control signal for controlling the direction and speed of the motor by the difference between the space currents of said devices, a limit switch arranged to be operated by a limit condition of said motor, and means controlled by operation of said limit switch for reducing the space current of the electron discharge device driving said motor into said limit condition and for increasing the space current of the other electron discharge device a proportional amount.

3. Limit stop apparatus for a motor comprising a control circuit including a pair of electron discharge devices arranged in a balanced circuit responsive to a control signal for controlling the direction and speed of the motor by the difference between the space currents of said devices, a limit switch arranged to be operated by a limit condition of said motor, and means controlled by operation of said limit switch for applying a negative potential to the control electrode of the electron discharge device driving said motor into said condition for cutting off the space current of said driving device.

4. Limit stop apparatus for a motor comprising a control circuit including a pair of electron discharge devices arranged in a balanced circuit responsive to a control signal for controlling the direction and speed of the motor by the difference between the space currents of said devices, a limit switch arranged to be operated by a limit condition of said motor, and means controlled by operation of said limit switch for applying a positive potential to the cathode of the electron discharge device driving said motor into said limit condition for cutting off space current of said driving device.

5. Limit stop apparatus for a motor comprising a control circuit including a pair of electron discharge devices arranged in a balanced circuit having their space currents controlled by a control signal, means connected to said devices for controlling the speed of the motor by the difference between the space currents of said device, and a limit switch arranged to be operated by a limit condition of said motor for reducing the control signal applied to one of said devices and adding said signal to that supplied to the other device.

6. Limit stop apparatus for a motor comprising a control circuit including a pair of electron discharge devices controlled by a control signal and arranged in a balanced circuit with opposing field windings of the motor connected in the space circuit of said devices to control the speed of said motor by the difference between the space currents of said devices and in accordance with the magnitude of said signal, and a limit switch arranged to be operated by a limit condition of said motor for applying a potential for reducing the space current of the more conductive device to stop said motor and reduce the current in the field winding thereof and to increase the space current in the other device from that when the motor is out of a limit-stop condition by an amount proportional to the magnitude of said signal.

7. Limit stop apparatus for a motor comprising a control circuit including a pair of electron discharge devices controlled by a control signal and arranged in a balanced circuit with their space circuits connected to opposing field windings of a generator, the output of which controls the speed of a motor, to differentially vary the effective field of said generator according to the difference between the space currents of said devices in response to a control signal and in accordance with the magnitude of said signal, and a limit switch arranged to be operated by a limit condition of said motor for applying a potential to the more conductive of said devices thereby reducing the space current thereof to stop the motor and decrease the current in the field winding of said generator and to increase the space current in the other device from that when the motor is out of a limit-stop condition by an amount proportional to the magnitude of said signal.

8. Limit stop apparatus for a motor comprising a control circuit including a pair of electron discharge devices arranged in a balanced circuit with their control electrodes responsive to an error signal for controlling the direction and speed of the motor by the difference between the space currents of said devices, and a limit switch arranged to be operated by a limit condition of said motor for applying a cut-off voltage to one of said devices.

9. Limit stop apparatus for a motor comprising a control circuit including a pair of electron discharge devices arranged in a balanced circuit with their control electrodes responsive to an error signal for controlling the speed of a motor by the difference between the space currents of said devices, the direction of said motor being determined by the more conductive discharge device, and a limit switch arranged to be actuated by a limit condition of said motor for applying a cut-off voltage to said more conductive device.

10. Limit stop apparatus for a motor comprising a control circuit responsive to a control signal for controlling the motor and including two control means responsive to opposing signals and having their outputs differentially supplied to control the speed and direction of operation of said motor, a limit switch arranged to be actuated by a limit condition of said motor, and means connected to be controlled by actuation of said limit switch for adding a component of the one signal to the other to apply a reverse torque impulse to said motor.

11. Limit stop apparatus for a motor comprising a control circuit including two control means responsive to opposing signals and having their outputs differentially supplied to control the speed and direction of operation of the motor, a limit switch arranged to be actuated by a limit condition of said motor, and means connected to be controlled by actuation of said limit switch and responsive to said control signal for adding a component of the one signal to the other whereby to apply a reverse torque impulse to said motor dependent upon said control signal.

12. Limit stop apparatus for a motor comprising a control circuit including two control means responsive to opposing signals and having their outputs differentially supplied to control the speed and direction of operation of the motor, a limit switch arranged to be actuated by a limit condition of said motor, and means controlled by actuation of said limit switch for adding a component of the one signal to the other whereby to apply a reverse torque impulse to said motor corresponding to the velocity of said motor.

13. Limit stop apparatus for a motor comprising a control circuit including two control means responsive to opposing signals and having their outputs differentially supplied to control the speed and direction of operation of the motor, a limit switch arranged to be actuated by a limit condition of said motor, and means connected to be controlled by actuation of said limit switch for adding a component of the one signal to the other whereby to reduce the driving torque thereof and simultaneously to produce a reverse torque impulse in said motor.

14. Limit stop apparatus for a motor comprising a control circuit including a pair of electron discharge devices arranged in a balanced circuit responsive to a control signal for producing an unbalance of the space currents of said devices, means connected to said devices for controlling a motor by the difference between said space currents, and a limit switch arranged to be actuated by a limit condition of said motor for reversing the unbalance of said currents for an interval to stop said motor and adding a component of said control signal to the signal supplied to one of said devices.

15. Limit stop apparatus for a motor comprising a control circuit including a pair of electron discharge devices arranged in a balanced circuit responsive to a control signal for producing an unbalance of the space currents of said devices, means connected to said devices for controlling a motor by the difference between said space currents, and a limit switch arranged to be actuated by a limit condition of said motor for applying an added positive potential to the lesser conductive device dependent upon said control signal for momentarily reversing the unbalance of said currents to apply a reverse torque to said motor dependent upon said control signal.

16. Limit stop apparatus for a motor comprising a control circuit including a pair of electron discharge devices arranged in a balanced circuit responsive to a control signal for producing an unbalance of the space currents of said devices, means connected to said devices for controlling a motor by the difference between said space currents, and a limit switch arranged to be actuated by a limit condition of said motor for applying an added voltage to the lesser conductive of said devices to momentarily reverse the unbalance of said currents to produce a reverse torque impulse in said motor.

17. Limit stop apparatus for a motor comprising a control circuit including a pair of electron discharge devices arranged in a balanced circuit responsive to a control signal for producing an unbalance of the space currents of said devices, means connected to said devices for controlling a motor by the difference between said space currents, and a limit switch arranged to be actuated by a limit condition of said motor for applying a cut-off potential to the more conductive of said devices and momentarily reversing the unbalance of said currents to produce a reverse torque in said motor.

18. Limit stop apparatus for a motor comprising a control circuit including a pair of electron discharge devices arranged in a balanced circuit responsive to a control signal for unbalancing the relative conductivity of said devices, means connected to said devices for controlling the speed of the motor by the difference between the space currents of said devices, a limit switch arranged to be actuated by a limit condition of the motor, and means connected to be controlled by actuation of said limit switch for providing an added pulse voltage to cause momentary increase in the conductivity of the lesser conductive device thereby producing a reverse torque impulse to stop said motor.

19. Limit stop apparatus for a motor comprising a control circuit including a pair of electron discharge devices arranged in a balanced circuit responsive to a control signal for unbalancing the relative conductivity of said devices, means connected to said devices for controlling the speed of the motor by the difference between the space currents of said devices, a limit switch arranged to be actuated by a limit condition of the motor, and means connected to be controlled by actuation of said limit switch for providing an added pulse voltage dependent upon said control signal to cause a momentary increase in the conductivity of the lesser conductive device thereby producing a reverse torque impulse dependent upon said control signal to stop said motor.

20. Limit stop apparatus for a motor comprising a control circuit including a pair of electron discharge devices arranged in a balanced circuit responsive to a control signal for unbalancing the relative conductivity of said devices, means connected to said devices for controlling the speed of the motor by the difference between the space currents of said devices, a limit switch arranged to be actuated by a limit condition of the motor, means connected to be controlled by actuation of said limit switch for reducing the conductivity of the more conductive device, and means connected to be controlled by actuation of said limit switch for providing an added pulse voltage to cause a momentary increase in the conductivity of the lesser conductive device thereby producing a reverse torque impulse to stop said motor.

21. In a motor control system, a control circuit comprising an input circuit for a control signal, a pair of electron discharge devices arranged in a balanced circuit connected to said input circuit and responsive to a control signal for rendering one of said devices more conductive than the other, a limit switch, and means responsive to actuation of said switch for applying an added pulse potential to the lesser conductive of said devices to momentarily increase the conductivity thereof.

22. In a motor control system, a control circuit comprising an input circuit for a control signal, a pair of electron discharge devices arranged in a balanced circuit connected to said input circuit and responsive to a control signal for rendering one of said devices more conductive than the other, a limit switch, and means responsive to actuation of said switch for applying a potential to cutoff the conductivity of the more conductive device.

23. In a motor control system, a control circuit comprising an input circuit for a control signal, a pair of electron discharge devices arranged in a balanced circuit connected to said input circuit and responsive to a control signal for rendering one of said devices more conductive than the other, a limit switch, means responsive to actuation of said switch for applying a potential to reduce conductivity of the more conductive device, and means responsive to actuation of said switch for applying a pulse potential to the lesser conductive of said devices to momentarily increase its conductivity.

24. In a motor control system, a control circuit comprising an input circuit for a control signal, a pair of electron discharge devices arranged in a balanced circuit connected to said input circuit and responsive to a control signal for rendering one of said devices more conductive than the other, a limit switch, and means responsive to actuation of said switch for applying a negative potential to the control electrode of the more conductive device to cutoff the conductivity thereof.

25. In a motor control system, a control circuit comprising an input circuit for a control signal, a pair of electron discharge devices arranged in a balanced circuit connected to said input circuit and responsive to a control signal for rendering one of said devices more conductive than the other, a limit switch, and means responsive to actuation of said switch for applying a positive potential to the cathode of the more conductive device to reduce conductivity thereof.

26. In a motor control system, a control circuit comprising an input circuit for a control signal, a pair of electron discharge devices arranged in a balanced circuit connected to said input circuit and responsive to a control signal for rendering one of said devices more conductive than the other, a limit switch, and means responsive to actuation of said switch for simultaneously applying a cut-off potential to the more conductive device to reduce the conductivity thereof, and a pulse potential to the lesser conductive device to momentarily increase the conductivity thereof.

WALTER THOMAS WHITE.
DONALD HENSCHELL COURTER.

REFERENCES CITED

The following references are of record in the file of this patent:

FOREIGN PATENTS

| Number | Country | Date |
|---|---|---|
| 102,887 | Sweden | Oct. 28, 1941 |